(12) United States Patent
Bulle et al.

(10) Patent No.: US 11,084,406 B2
(45) Date of Patent: Aug. 10, 2021

(54) HEADREST DEVICE AND VEHICLE SEAT COMPRISING SUCH A HEADREST DEVICE

(71) Applicant: FAURECIA Sièges d'Automobile, Nanterre (FR)

(72) Inventors: Hervé Bulle, Hericourt (FR); Emeric De Bosschere, Etampes (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 0 days.

(21) Appl. No.: 16/945,083

(22) Filed: Jul. 31, 2020

(65) Prior Publication Data

US 2021/0031661 A1    Feb. 4, 2021

(30) Foreign Application Priority Data

Aug. 2, 2019    (FR) ..................... 19 08888

(51) Int. Cl.
*B60N 2/853* (2018.01)
*B60N 2/897* (2018.01)
*B60N 2/838* (2018.01)

(52) U.S. Cl.
CPC ............. *B60N 2/853* (2018.02); *B60N 2/838* (2018.02); *B60N 2/897* (2018.02)

(58) Field of Classification Search
CPC ......... B60N 2/853; B60N 2/838; B60N 2/897
See application file for complete search history.

(56) References Cited

U.S. PATENT DOCUMENTS

| | | | | |
|---|---|---|---|---|
| 6,270,161 B1* | 8/2001 | De Filippo | ............ | B60N 2/838 297/410 |
| 7,070,205 B2* | 7/2006 | Becker | ................... | B60N 2/865 280/751 |
| 8,075,051 B2* | 12/2011 | Vitali | ..................... | B60N 2/809 297/216.12 |
| 8,833,851 B2* | 9/2014 | Corral Rodriguez | .. | B60N 2/888 297/216.12 |
| 10,315,546 B2* | 6/2019 | An | ......................... | B60N 2/865 |
| 10,562,425 B2* | 2/2020 | Jarrin | ..................... | B60N 2/865 |
| 10,654,389 B2* | 5/2020 | Hemmer | ............... | B60N 2/865 |
| 10,703,242 B2* | 7/2020 | Spackman | ............ | B60N 2/847 |
| 2005/0062330 A1 | 3/2005 | Eberle | | |
| 2007/0075578 A1 | 4/2007 | Klukowski | | |

(Continued)

FOREIGN PATENT DOCUMENTS

DE    102015206956 A1    10/2015
FR    2891505 A1    4/2007

(Continued)

*Primary Examiner* — Philip F Gabler
(74) *Attorney, Agent, or Firm* — Barnes & Thornburg LLP (57) ABSTRACT

A headrest device comprises: a headrest support that is pivotable relative to a backrest frame of a vehicle seat, about a first transverse axis; a headrest frame that is pivotable relative to the headrest support about a second transverse axis; and a tilt compensation device for the headrest frame. The compensation device comprises a connecting element in two parts that are pivotable relative to one another, and first and second pivotable guide pins respectively received in a first guide path in the headrest support and in a second guide path formed by the headrest frame. The second part of the connecting element is guided in translation relative to the headrest support in a direction perpendicular to the first axis.

12 Claims, 10 Drawing Sheets

(56) References Cited

U.S. PATENT DOCUMENTS

| | | | |
|---|---|---|---|
| 2007/0246989 A1* | 10/2007 | Brockman | B60N 2/865 |
| | | | 297/391 |
| 2015/0130247 A1 | 5/2015 | Kondrad | |
| 2015/0251574 A1* | 9/2015 | Ishihara | B60N 2/829 |
| | | | 297/391 |
| 2015/0329023 A1* | 11/2015 | Ishihara | B60N 2/865 |
| | | | 297/406 |
| 2016/0214512 A1 | 7/2016 | Talamonti | |
| 2016/0250953 A1 | 9/2016 | Yoo | |
| 2017/0313218 A1* | 11/2017 | Line | B60N 2/865 |

FOREIGN PATENT DOCUMENTS

| | | |
|---|---|---|
| JP | 2005087650 A | 4/2005 |
| KR | 20120083979 A | 7/2012 |
| KR | 20130072837 A | 7/2013 |

\* cited by examiner

HEADREST DEVICE AND VEHICLE SEAT COMPRISING SUCH A HEADREST DEVICE

PRIORITY CLAIM

This application claims priority to French Patent Application No. FR 19 08888, filed Aug. 2, 2019, which is expressly incorporated by reference herein.

BACKGROUND

The present disclosure relates to a headrest device of a vehicle seat, and particularly to a vehicle seat comprising such a headrest device.

SUMMARY

According to the present disclosure, a headrest device for a vehicle seat is proposed. The vehicle seat comprising a backrest with a backrest frame, the headrest device comprises:

a headrest support, the headrest support being intended to be mounted so as to pivot relative to the backrest frame about a first substantially transverse axis;

a headrest frame, the headrest frame being mounted so as to pivot relative to the headrest support about a second substantially transverse axis; and a tilt compensation device for the headrest frame.

In illustrative embodiments, the tilt compensation device comprises:

a connecting element, the connecting element being implemented as two parts mounted so as to pivot relative to one another about a third, substantially transverse mobile axis, a first guide pin fixed to a first part of the connecting element, the first guide pin being received in a first guide path formed by the headrest support such that the first part of the connecting element is free to rotate relative to the first guide pin and/or the first guide pin is free to rotate relative to the headrest support, about a fourth, substantially transverse mobile axis, a second guide pin, fixed to the second part of the connecting element, the second guide pin being received in a second guide path formed by the headrest frame, such that the second part of the connecting element is free to rotate relative to the second guide pin and/or the second guide pin is free to rotate relative to the headrest frame, about a fifth, substantially transverse mobile axis, the second part of the connecting element being guided in translation relative to the headrest support in a direction perpendicular to the first axis.

Thus, according to the present disclosure, in order to adjust the longitudinal position of the headrest, it is mounted so as to pivot about a transverse axis, relative to the seat backrest. Rotating the headrest adjusts the position of the area of contact for the occupant's head along with the headrest, in the longitudinal direction of the seat. It is thus possible to design a more compact and/or more aesthetic headrest.

In addition, the tilt compensation device can compensate for some or all of the tilt of the headrest due to the rotation of the headrest support.

In illustrative embodiments, the headrest device has one or more of the following features, alone or in combination:

the headrest device comprises a structure intended to be fixed to the backrest frame of the vehicle seat, the headrest support being fixed to the structure so as to be pivotable about the first transverse axis, relative to the structure;

the headrest device further comprises an actuator for adjusting the position of the headrest support, about the first transverse axis;

the actuator comprises a motor, at least one worm screw oriented parallel to the first transverse axis, the worm screw being driven by the rotation of the motor, a movable assembly driven in translational movement substantially parallel to the first transverse axis by the rotation of the worm screw, and a control member fixed to the first guide pin, the movable assembly and the control member having complementary reliefs such that the translational movement of the movable assembly in a direction substantially parallel to the first transverse axis causes a displacement of the control member in a direction substantially perpendicular to the first transverse axis;

the complementary reliefs comprise at least one slot extending at an angle relative to the direction of the first transverse axis, and at least one pin received in the at least one slot;

the second part of the connecting element is received in one or more grooves in the headrest support such that the second part of the connecting element is guided in translation relative to the headrest support;

the headrest support comprises a first part forming the first guide path, at least one housing, preferably two housings, for receiving a support rod of the headrest frame, and a second part forming a support tube of the headrest frame, the second part having a "U" shape such that each of its ends is received in a respective housing, the headrest frame forming a housing for receiving the second part of the headrest support;

the headrest support further comprises a third part partially covering the second part of the headrest support and preferably forming the groove or grooves for guiding in translation the second part of the connecting element with respect to the headrest support; and the first, second, and fifth transverse axes are substantially aligned within a longitudinal plane of the vehicle seat.

In illustrative embodiments, a motor vehicle seat is described comprising a seating portion with a seating portion frame, a backrest with a backrest frame, and a headrest device as described above, in all its combinations, the headrest support being mounted on the backrest frame, via the structure where appropriate, so that the headrest support is pivotable about a transverse axis, relative to the backrest frame.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

In the different figures, the same references designate identical or similar elements. For brevity, only the elements which are useful to understanding the described embodiment are shown in the figures and are described in detail below.

In the following description, when reference is made to absolute position qualifiers such as the terms "front", "rear", "top", "bottom", "left", "right", etc., or relative qualifiers such as the terms "above", "below", "upper", "lower", etc., or to orientation qualifiers such as "horizontal", "vertical", etc., unless otherwise specified these are in reference to the orientation of the figures or of a seat in its normal position of use.

Figure 1:
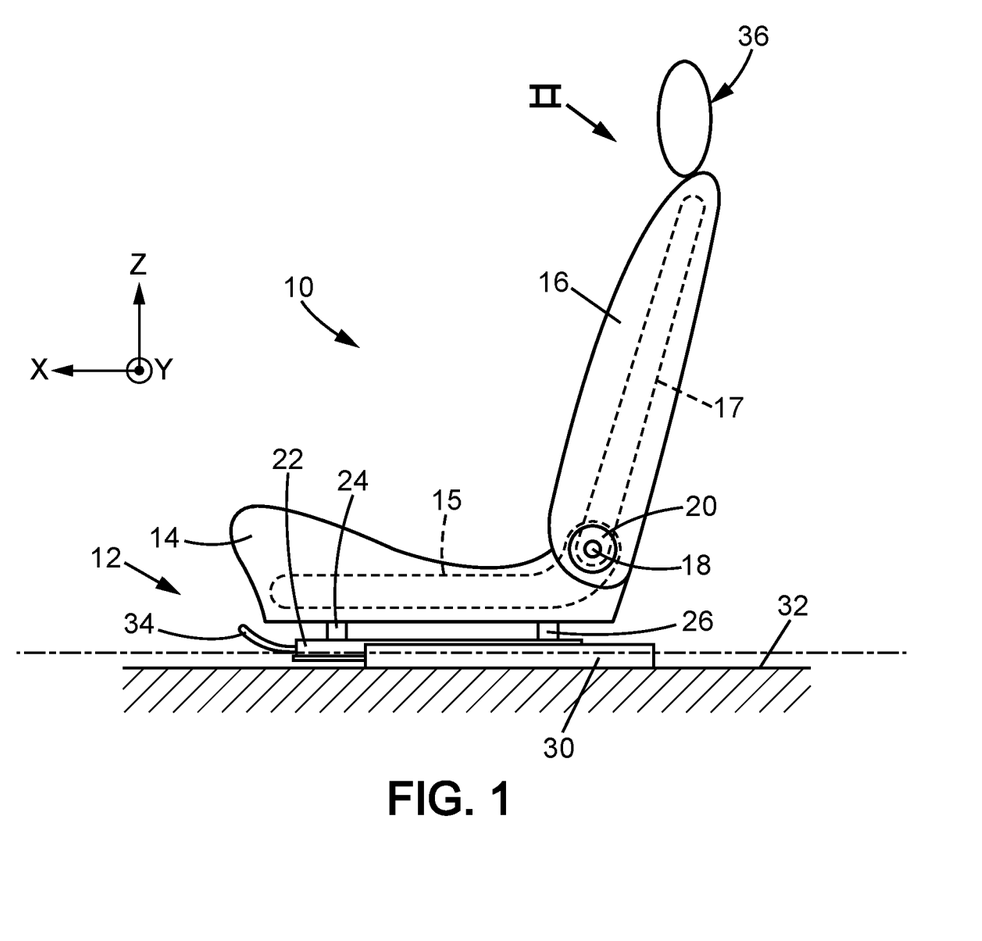
FIG. 1 schematically represents a side view of a vehicle seat provided with an exemplary headrest device.
Figure 2:
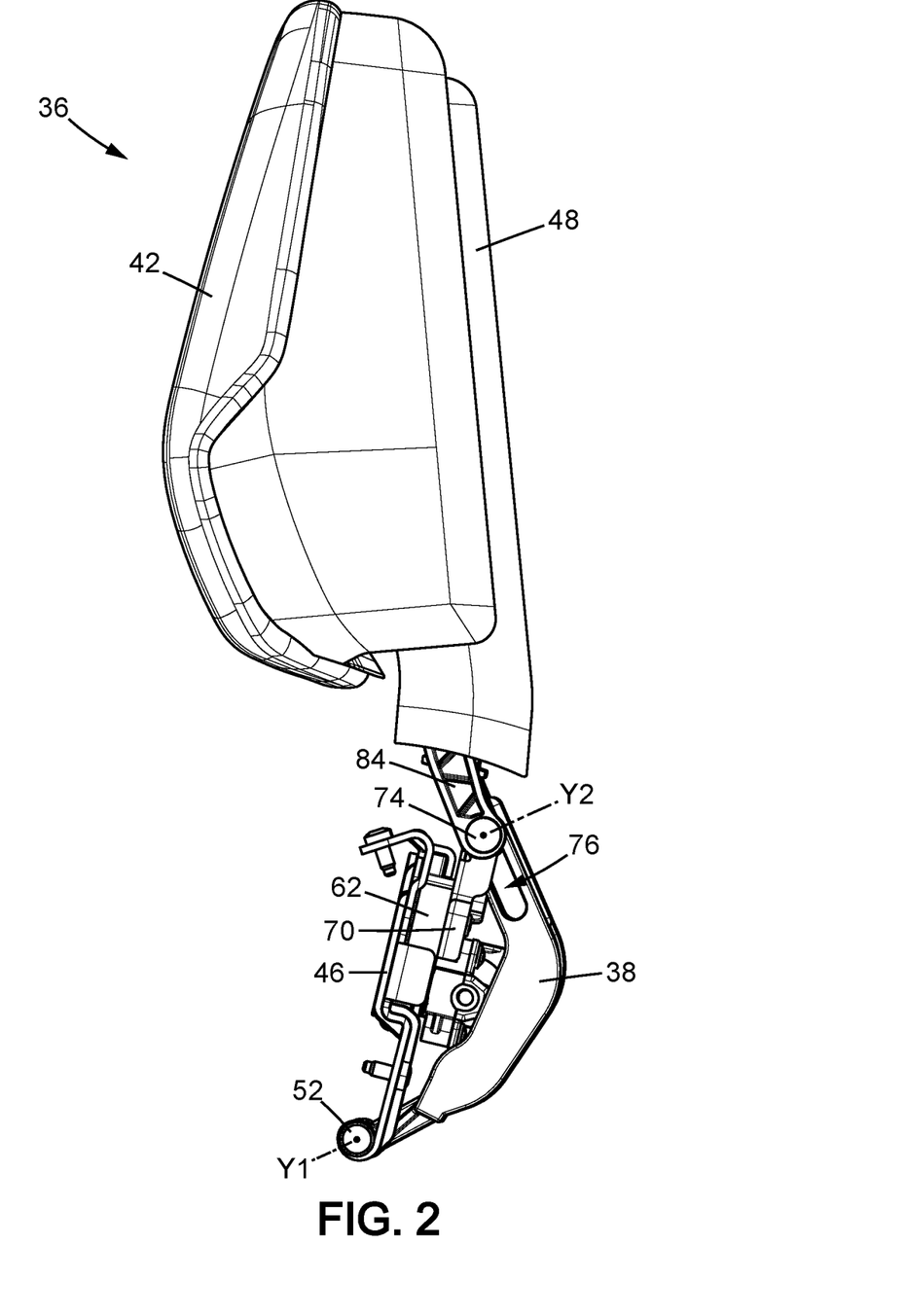
FIG. 2 is a side view of a headrest device which can be fitted to the vehicle seat of FIG. 1, in the most rearward position.
Figure 3:
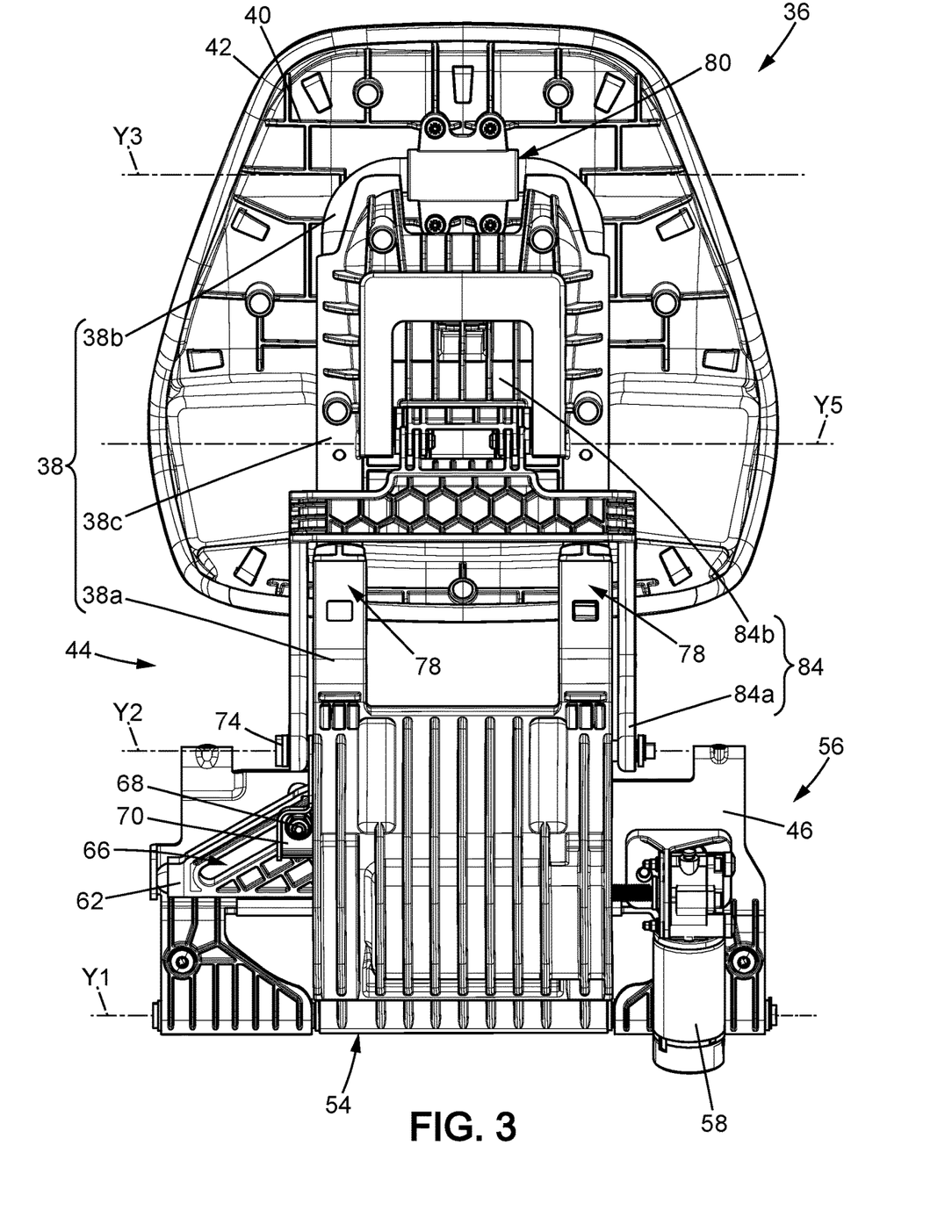
FIG. 3 is a rear view of the headrest device of FIG. 2.
Figure 4:
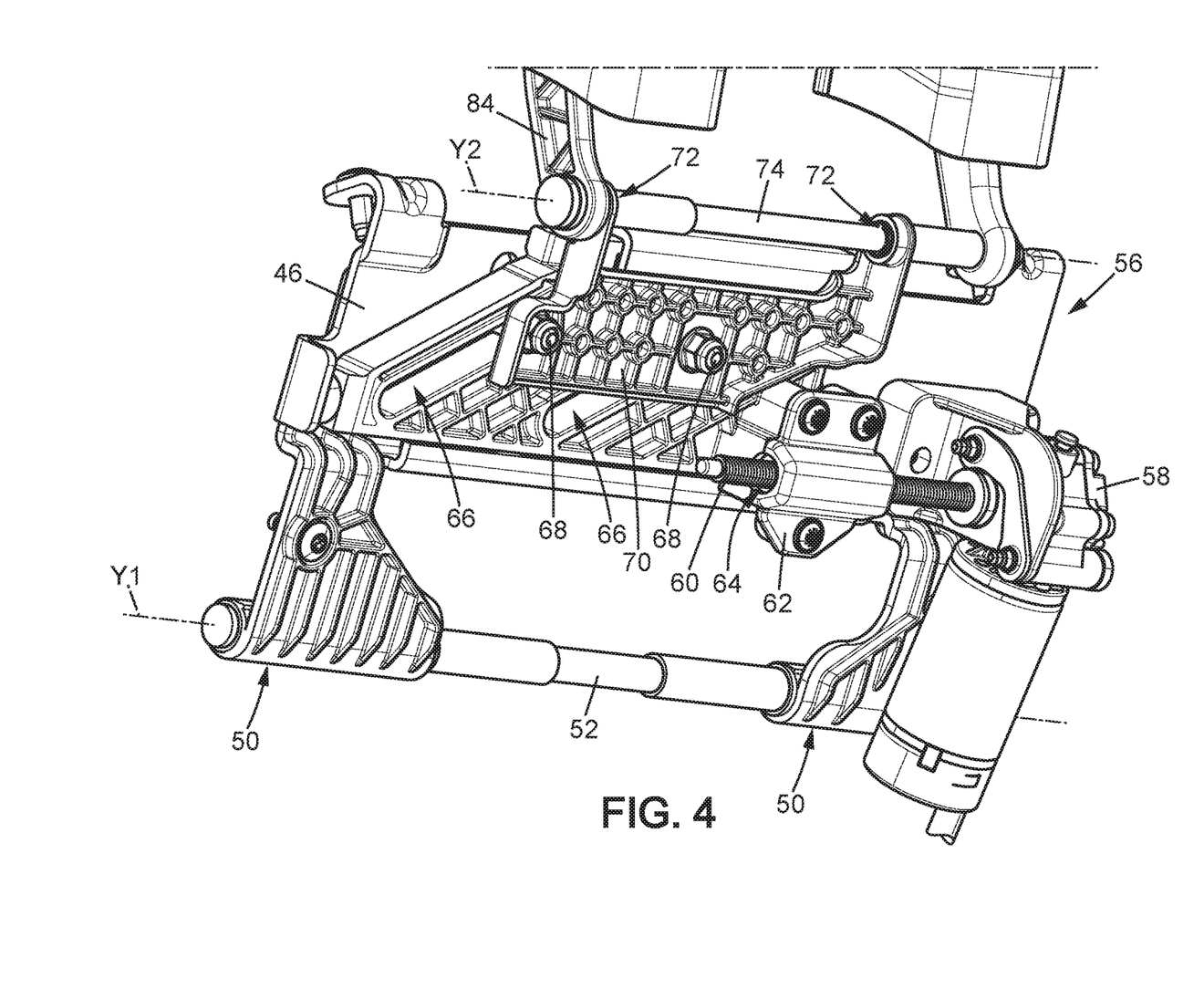
FIG. 4 is a perspective view of details of the headrest device of FIG. 2.
Figure 5A:
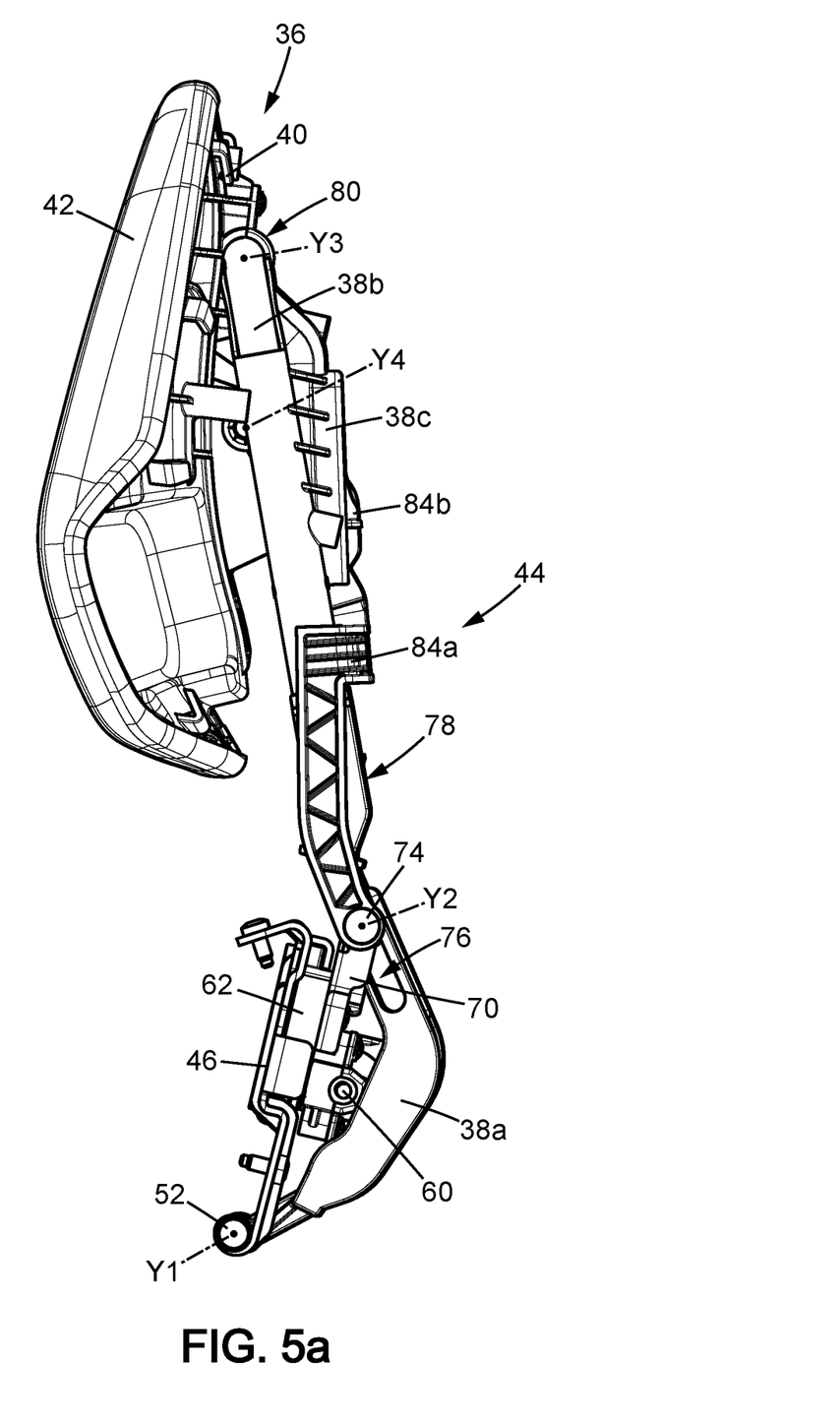
FIG. 5a is a view similar to FIG. 2, in which part of the headrest upholstery is removed.
Figure 5B:
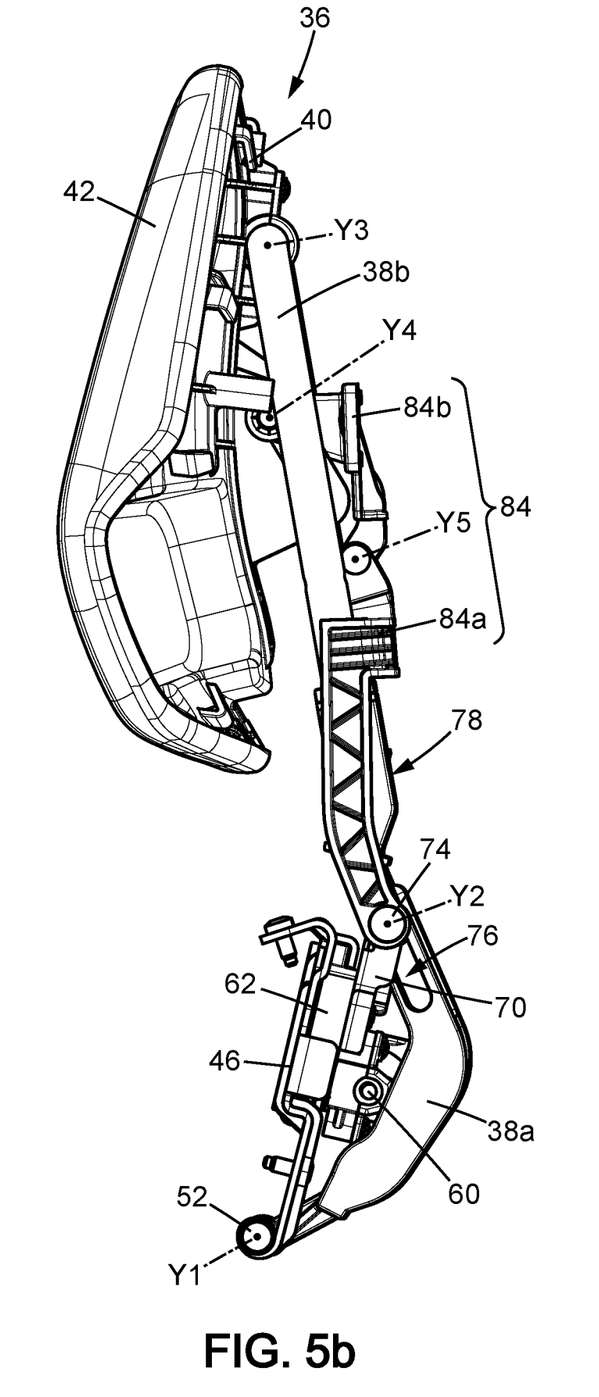
FIG. 5b is a view similar to FIG. 5a, in which part of the headrest support is removed.

FIG. 1 schematically represents a motor vehicle seat 10 mounted on a slide mechanism 12.

In the following, the longitudinal direction X means the longitudinal direction of the seat. The longitudinal direction of the seat is considered to be the same as the longitudinal direction of the motor vehicle in which the seat is mounted. This longitudinal direction X corresponds to the normal direction of advancement of the vehicle. The transverse direction Y is the transverse direction of the seat. The transverse direction of the seat thus corresponds to the transverse or lateral direction of the motor vehicle. This transverse direction corresponds to a direction perpendicular to the normal direction of advancement of the vehicle. Finally, the vertical direction Z is a vertical direction of the seat, perpendicular to the longitudinal and transverse directions.

The seat 10 comprises a seating portion 14, with a seating portion frame 15, on which is mounted a backrest 16 with a backrest frame 17, generally pivoting about an axis 18 via a hinge mechanism 20. The seating portion 14 is mounted on movable profiles 22, also called sliders or male profiles, by means of feet or crosspieces 24, 26. Each movable profile 22 is part of a slide 12 and is associated with a fixed profile 30. The fixed profile 30 is also called a rail or female profile. The fixed profile 30 is fixed to the floor 32 of a motor vehicle. In this example, the seat 10 comprises a manual control member 34, called a handle, for controlling the sliding of the slides 12. This manual control member 34 makes it possible in particular to lock and unlock systems that prevent the sliding of the movable profiles relative to the respective fixed profiles. Once the prevention systems have been released, the manual control member 34 can also be used to slide the movable profiles 22 of the slide 12 relative to their respective fixed profiles 30 along the longitudinal direction X of the slides 12. The fixed 30 and movable 22 profiles of the slides 12 are generally of metal.

The seat 10 also comprises a headrest device 36. In the following, the mounting of the headrest device 36 on the backrest 16 is described in more detail.

As is more particularly visible in FIGS. 2 to 8, the headrest device 36 comprises a headrest support 38, a headrest frame 40, and headrest upholstery 42. The headrest device 36 further comprises a tilt compensation device 44 for the headrest frame 40, which will be described in more detail below. In the illustrated example, the headrest device 36 comprises a structure 46 relative to which the headrest support 38 is mounted so as to pivot about an axis Y1 extending substantially in a transverse direction Y of the seat 10. For example, this structure 46 may be screwed or riveted to the backrest frame 17. Other methods of fixing the structure 46 to the backrest frame 17 are conceivable. Alternatively, the structure 46 of the headrest device 36 may be formed by the seat 1, in particular by the backrest frame 17. In addition, the headrest frame 40 may be hidden under a headrest shroud 48.

Figure 6:
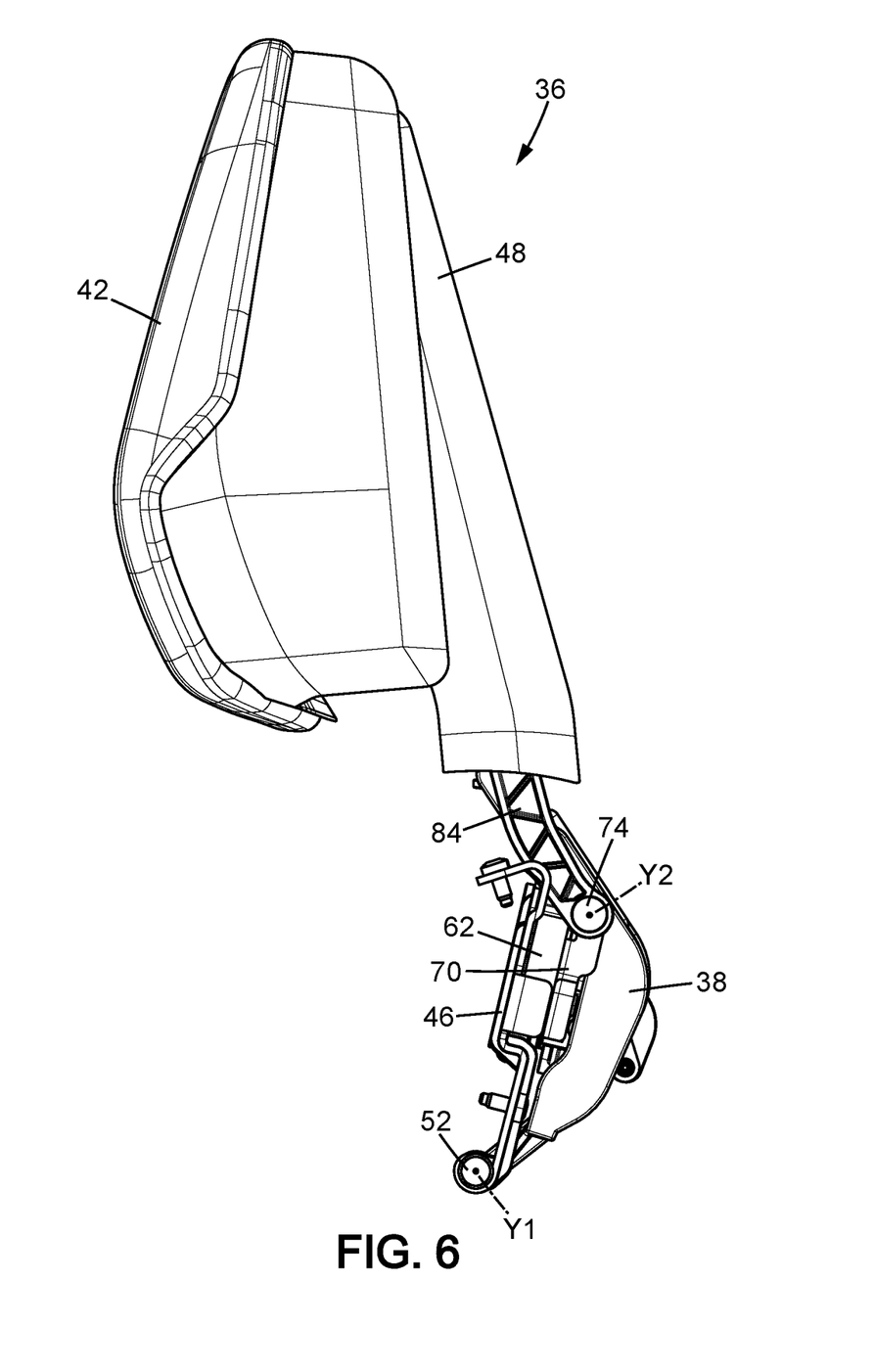
FIG. 6 is a view similar to FIG. 2, of the headrest device in its most forward position.
Figure 7:
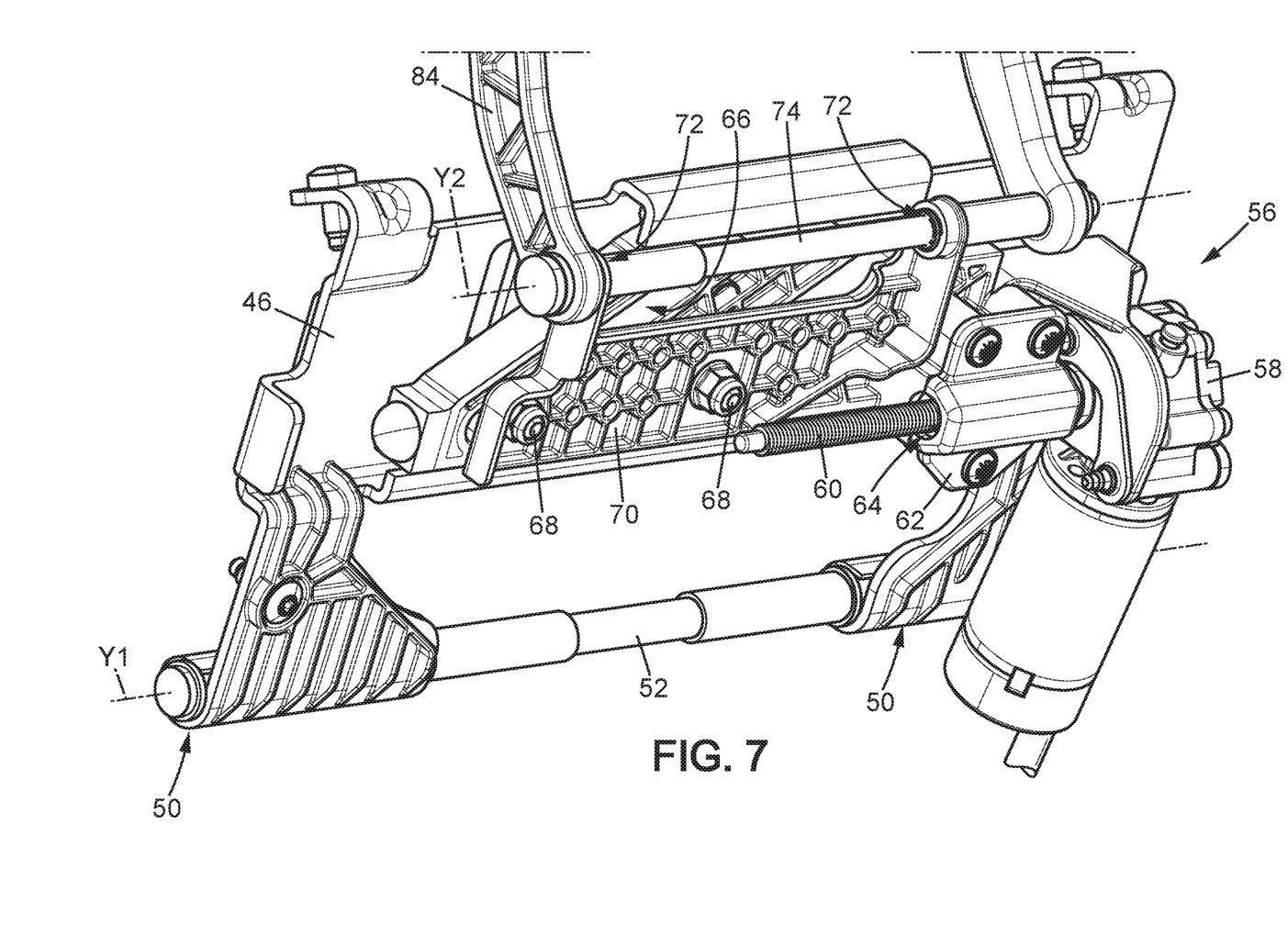
FIG. 7 is a view similar to FIG. 4, of the headrest device in its most forward position.
Figure 8A:
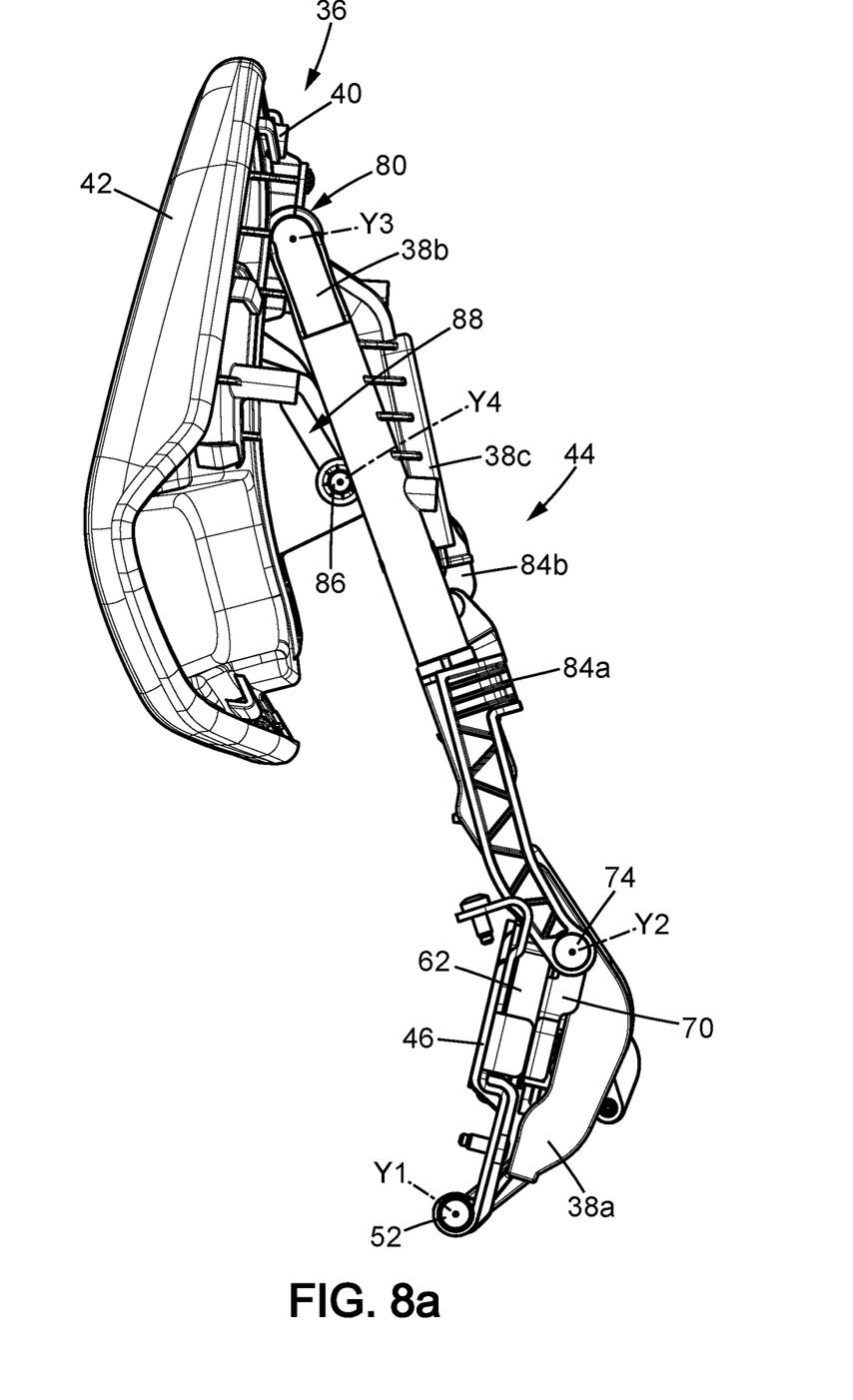
FIG. 8a is a view similar to FIG. 5a, of the headrest device in its most forward position.
Figure 8B:
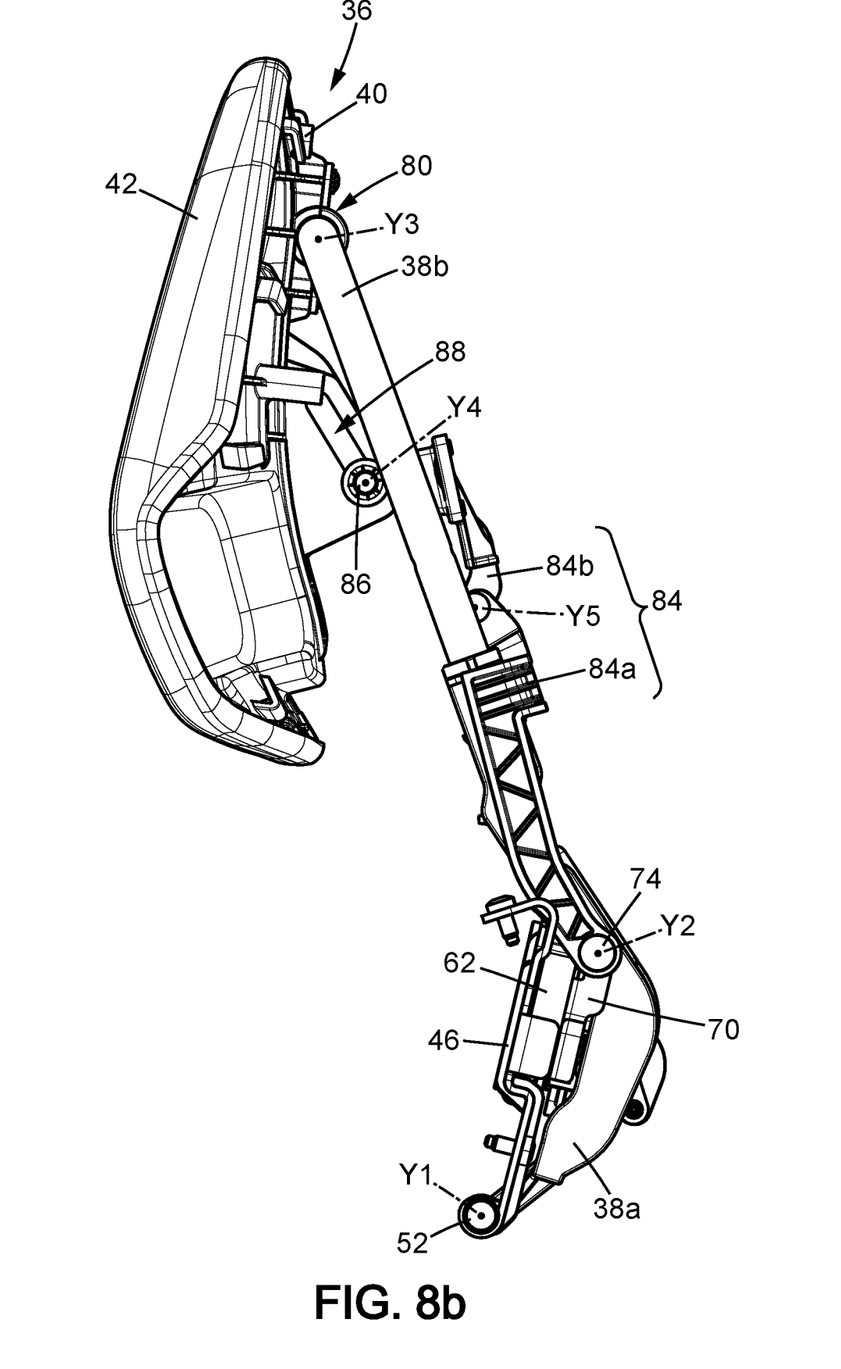
FIG. 8b is a view similar to FIG. 5b, of the headrest device in its most forward position.

The headrest device 36 is shown in its entirety or in part in FIGS. 2 to 5, in an extremal, furthest rearward position relative to the seat 10; FIGS. 6 to 8 illustrate an extremal, furthest forward position relative to the seat 10.

The structure 46 defines housings 50 for receiving a shaft 52 extending parallel to axis Y1 parallel to the transverse direction Y. The shaft 52 is also mounted in one or more corresponding housings 54 formed in the headrest support 38, in this case at the lower end of the headrest support 38. The headrest support 38 is thus pivotable about axis Y1 relative to the shaft 52 and/or the shaft 52 is pivotable about axis Y1 relative to the structure 46.

The headrest device 36 here comprises an actuator 56 for controlling the relative pivoting of the headrest support 38 with respect to the structure 46, about axis Y1. In the example illustrated, the actuator 56 firstly comprises an electric geared motor 58, fixed in position relative to the structure 46. In this case, the geared motor 58 is fixed on the structure 46. The geared motor 58 drives a worm screw 60 to rotate about a transverse axis. A movable assembly 62 is mounted on the worm screw 60, so that the rotation of the worm screw 60, in one direction or the other, causes a translational movement of the movable assembly 62 parallel to the axis of the worm screw 60. To do this, here the movable assembly 62 comprises a threaded housing 64 receiving the worm screw 60, the movable assembly 62 being received in a groove of the structure 46, preventing rotation of the movable assembly 62 relative to the structure 46.

Furthermore, the movable assembly 62 defines two slots 66 diagonal to the direction of extension of the worm screw 60. A bolt 68 secured to a plate 70 is received in each slot 66, such that the movement of the bolt 68 in the slot 66 in which it is received can be guided. Thus, a transverse movement of the movable assembly 62, controlled by the rotation of the worm screw 60, results in a substantially vertical movement of the plate 70. The plate 70 defines, here at its uppermost end, two housings 72 for receiving a rod 74.

The rod 74 is also received in two slots 76 formed on the headrest support 38. The headrest support 38 is free to rotate about the substantially transverse and mobile axis Y2 of the rod 74 and/or the rod 74 is free to rotate about axis Y2 relative to the plate 70. This forms a sliding pivot connection between the headrest support 38 and the structure 46. Thus, the rotational movement of the worm screw 60, controlled by the rotation of the geared motor 58, causes a transverse movement of the movable assembly 62 mounted on the worm screw, which in turn causes a substantially vertical movement of the plate 70, controlled by the guiding of the bolts 68 in the slots 64, which in turn causes a movement of the rod 74 in the slots 76 of the headrest support 38. Thus, ultimately, the rotation of the headrest support 38 relative to the structure 46, about the transverse axis Y1, is controlled in this manner. It should be noted here that the movement of the plate 70 may not be perfectly vertical, as long as it comprises a vertical component. In other words, the movement of the plate 70 is carried out here in a direction perpendicular to the transverse direction and to the longitudinal direction of the seat.

The headrest frame 40 is mounted to rotate freely about a transverse axis Y3, relative to the headrest support 38, in the current case at its uppermost end. To do this, the headrest support 38 here is made of three parts fixed together:

a lower first part 38a, forming the slots 76 and two housings 78 for receiving the support rod of the headrest frame 38;

an upper second part 38b, forming a support tube of the headrest frame, having a curved or "U" shape such that each of its ends is received in a respective housing 78; and a third part 38c, here partially covering the second part 38b.

The headrest frame 40 defines a housing 80 for receiving the tube 38b, such that the headrest frame 40 is free to rotate relative to the headrest support 38, about axis Y3.

However, to compensate for some or all of the tilt of the headrest frame 40 due to the rotation of the headrest support 38, here there is provided a tilt compensation device 44 for the headrest frame 40. In the current case, this device comprises a connecting element 84. The connecting element 84 here is formed of two parts 84a, 84b which pivot relative to one another about a transverse axis Y5. The connecting element 84 here substantially has a "Y" shape. The first part 84a of the connecting element 84 substantially has a "U" shape with housings 76 at the ends of the arms of the "U", for receiving the rod 74, freely rotating about axis Y2. Thus, a movement of the rod 74, upwards or downwards, causes a displacement of the connecting element 84. Furthermore, the second part 84b of the connecting element 84 has substantially the shape of a plate, guided in translation in grooves provided for this purpose in the third part 38c of the headrest support 38. The second part 84b also defines a housing for receiving a pin 86. The pin 86 is received in two slots 88 formed in the headrest frame 40. Thus, the movement of the pin 86 is guided by the slots 88. In addition, the connecting element 84 is free to rotate about a substantially transverse axis Y4 relative to the pin 86 and/or the pin is free to rotate relative to the headrest frame 40, about axis Y4. Axis Y4 is movable, within a plane normal to the transverse direction Y. Thus a sliding pivot connection is obtained between the connecting element 84, in particular between the second part 84b of the connecting element 84, and the headrest frame 40.

Thus, the displacement of the rod 74 in the slots 76 concurrently causes a displacement of the connecting element 84, this displacement being guided in translation by the headrest support 38. This displacement of the connecting element 84 causes a displacement of the pin 86 in the slots 88 of the headrest frame 40, causing a pivoting of the headrest frame which tends to compensate for some or all of the tilt of the headrest frame 40 due to the rotation of the headrest support 38 about axis Y1.

It should be noted here that axes Y1, Y3, and Y4 are substantially aligned within a plane XZ normal to the transverse direction Y.

The position of the headrest device 36 relative to the seat backrest can thus easily be adjusted, while still having a headrest device of limited size, in particular in the longitudinal direction of the seat, and while maintaining a substantially constant orientation of the headrest between the different adjustment positions.

The present disclosure is not limited to the embodiment described above solely as an example.

For example, the geared motor may be a simple motor or a motor which rotates a reduction gear separate from the motor.

In the example illustrated, the geared motor rotates a worm screw which is secured to a movable assembly which it drives in translation. Alternatively, the motor or the geared motor may be associated with a rack.

Also, in the illustrated example, the headrest device is provided with an actuator for controlling the adjustment of the position of the headrest device relative to the backrest of the vehicle seat. Alternatively, however, the headrest device is without an actuator, the position of the headrest device being adjusted manually. In this case, the headrest device may be provided with a means for locking the position of the headrest device, after its position has been set manually.

Other types of actuators may also be used, in particular other electric motor-type actuators may be used.

To improve the comfort of the occupant of a vehicle seat, the seat may provide several adjustments allowing it to better adapt to the morphology of the occupant. The position of the seat can be adjusted relative to the steering wheel, based on the size of the occupant. The backrest of the seat can be more or less tilted relative to the seating portion of the seat. The seat can also be equipped with a headrest for which the raised position relative to the seat backrest can be adjusted by the occupant.

In one example, a headrest may be modified to change the area supporting the occupants head. Comparative headrests have a frame and a portion that is movable relative to the frame, in the longitudinal direction of the seat. However, to obtain a satisfactory range of adjustments, it is then necessary to make the comparative headrest relatively thick (in the longitudinal direction of the seat). This thickness impacts negatively the aesthetics of the comparative headrest and of the seat in general.

The invention claimed is:

1. A headrest device for vehicle seat, the vehicle seat comprising a backrest with a backrest frame, the headrest device comprising:

a headrest support, the headrest support being intended to be mounted so as to pivot relative to the backrest frame about a first transverse axis;

a headrest frame, the headrest frame being mounted so as to pivot relative to the headrest support about a second transverse axis;

a tilt compensation device for the headrest frame, comprising:

a connecting element, the connecting element being implemented as two parts mounted so as to pivot relative to one another about a third, transverse axis, the third transverse axis being mobile, a first guide pin fixed to a first part of the connecting element, the first guide pin being received in a first guide path formed by the headrest support such that the first part of the connecting element is free to rotate relative to the first guide pin and/or the first pin guide is free to rotate relative to the headrest support, about a fourth transverse axis, the fourth transverse axis being mobile, a second guide pin, fixed to the second part of the connecting element, the second guide pin being received in a second guide path formed by the headrest frame, such that the second part of the connecting element is free to rotate relative to the second guide pin and/or the second guide pin is free to rotate relative to the headrest frame, about a fifth transverse axis, the fifth transverse axis being mobile, the second part of the connecting element being guided in translation relative to the headrest support in a direction perpendicular to the first axis.

2. The headrest device of claim 1, comprising a structure adapted to be fixed to the backrest frame of the vehicle seat, the headrest support being fixed to the structure so as to be pivotable about the first transverse axis, relative to the structure.

3. The headrest device of claim 1, further comprising an actuator for adjusting the position of the headrest support, about the first transverse axis.

4. The headrest device of claim 3, wherein the actuator comprises a motor, at least one worm screw oriented parallel to the first transverse axis, the worm screw being driven by the rotation of the motor, a movable assembly driven in translational movement substantially parallel to the first transverse axis by the rotation of the worm screw, and a control member fixed to the first guide pin, the movable assembly and the control member having complementary reliefs such that the translational movement of the movable assembly in a direction substantially parallel to the first transverse axis causes a displacement of the control member in a direction substantially perpendicular to the first transverse axis.

5. The headrest device of claim 4, wherein the complementary reliefs comprise at least one slot extending at an angle relative to the direction of the first transverse axis, and at least one pin received in the at least one slot.

6. The headrest device of claim 1, wherein the second part of the connecting element is received in at least one groove in the headrest support such that the second part of the connecting element is guided in translation relative to the headrest support.

7. The headrest device of claim 1, wherein the headrest support comprises a first part forming the first guide path, at least one housing for receiving a support rod of the headrest frame, and a second part forming a support tube of the headrest frame, the headrest frame forming a housing for receiving the second part of the headrest support.

8. The headrest device of claim 7, wherein the first part forms two housings for receiving a support rod of the headrest frame, the second part having a "U" shape such that each ends of the second part is received in a respective housing.

9. The headrest device of claim 7, wherein the headrest support further comprises a third part partially covering the second part of the headrest support.

10. The headrest device of claim 9, wherein the third part of the headrest support forms the at least one groove for guiding in translation the second part of the connecting element with respect to the headrest support.

11. The headrest device of claim 1, wherein the first, second, and fifth transverse axes are aligned within a longitudinal plane of the vehicle seat.

12. A motor vehicle seat comprising a seating portion with a seating portion frame, a backrest with a backrest frame, and the headrest device of claim 1, the headrest support being mounted on the backrest frame, such that the headrest support is pivotable about a transverse axis, relative to the backrest frame.

\* \* \* \* \*